United States Patent [19]

Brennemann et al.

[11] 4,028,493
[45] June 7, 1977

[54] CALL PROGRESS SIGNAL DETECTOR

[75] Inventors: Andrew Ernest Brennemann; Suk Suet Soo, both of Ossining, N.Y.

[73] Assignee: International Business Machines Corporation, Armonk, N.Y.

[22] Filed: Dec. 22, 1975

[21] Appl. No.: 643,213

[52] U.S. Cl. .............................. 179/2 DP; 179/5 R
[51] Int. Cl.² ........................................ H04M 11/06
[58] Field of Search ..... 179/175.2 R, 5 R, 175.2 C, 179/90 R, 2 DP; 235/92 T

[56] References Cited
UNITED STATES PATENTS

| | | | |
|---|---|---|---|
| 3,317,828 | 5/1967 | Schuls | 235/92 T |
| 3,692,961 | 9/1972 | Le Strat et al. | 179/175.2 R |
| 3,885,108 | 5/1975 | Zock | 179/5 R |
| 3,899,645 | 8/1975 | Brafman | 179/5 R |
| 3,952,172 | 4/1976 | Penn et al. | 179/175.2 R |

Primary Examiner—Douglas W. Olms
Attorney, Agent, or Firm—Roy R. Schlemmer, Jr.

[57] ABSTRACT

This invention relates to apparatus for automatically connecting computer terminals and the like to telephone lines and further includes means for automatically analyzing telephone line call progress signals indicative of line status. The apparatus includes a band pass filter, variable gain amplifier, AM detector, a wave shaper, a signal cadence detector and means responsive to said cadence detector for indicating line status.

10 Claims, 6 Drawing Figures

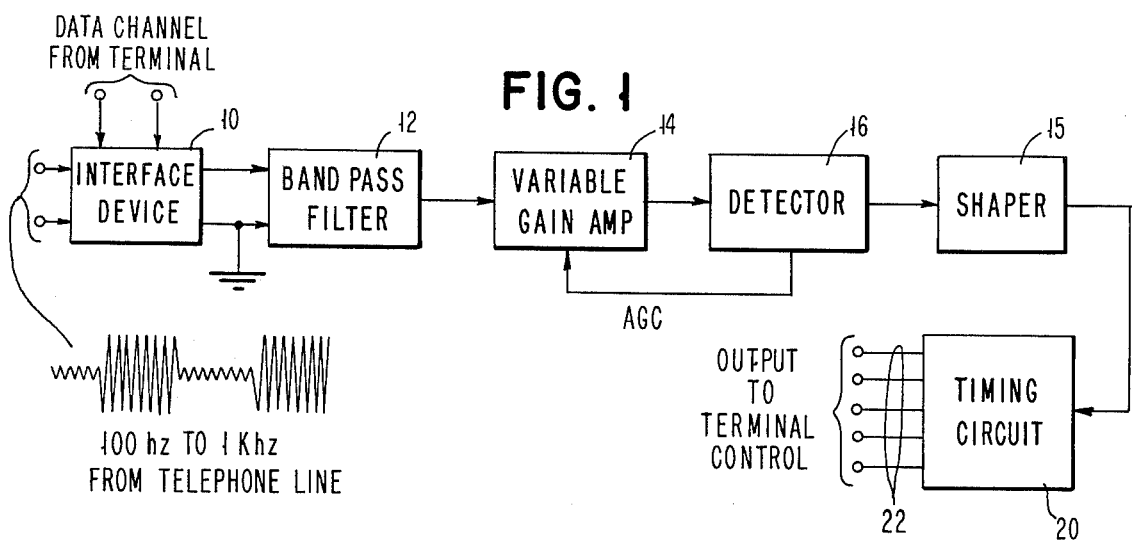
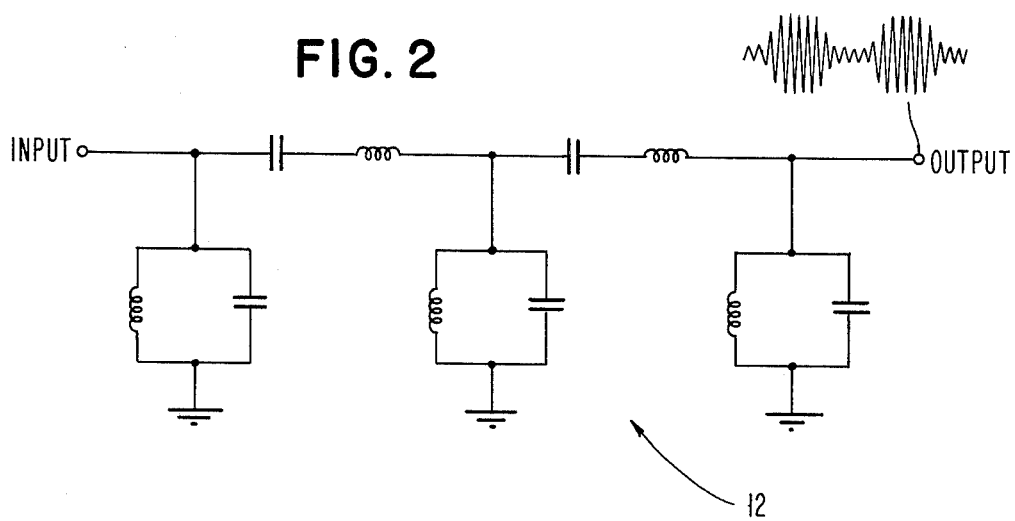
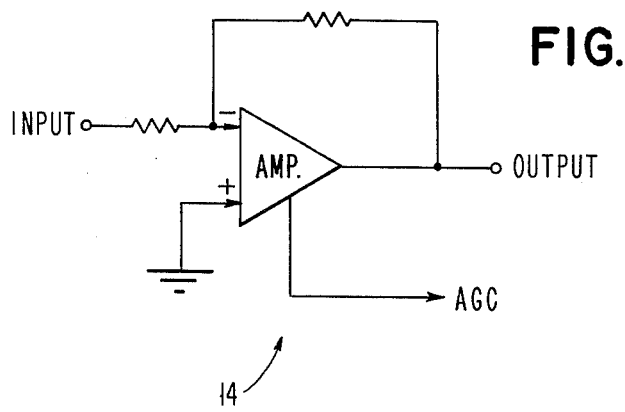

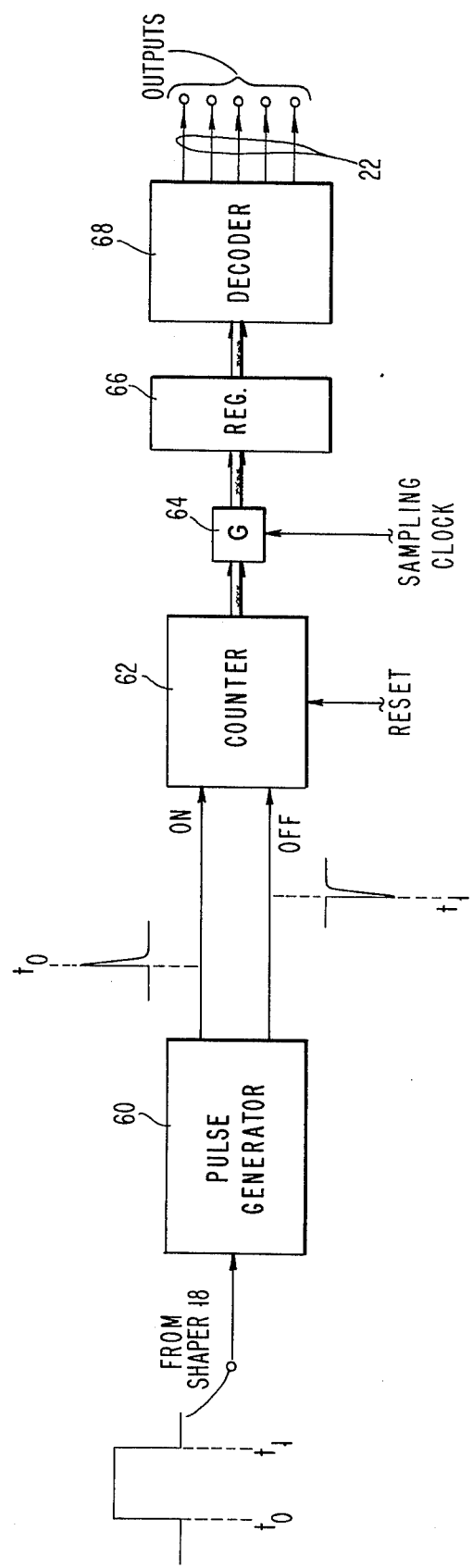

CALL PROGRESS SIGNAL DETECTOR

BACKGROUND OF THE INVENTION

In terminal oriented computer systems and computer network systems it is quite frequently desirable to utilize preexisting telephone lines and or facilities for connecting satellite computer and/or input-output terminals to a central computing facility. The utilization of existing telephone lines saves significant amounts of money contrasted with the expense of installing separate lines for connecting said terminals to the parent system. This is true when the communication system must connect, for example, bank branches located throughout a large metropolitan area to some central computing facility or even interconnect typewriter-like terminals within a single office building to a central computer room.

With such systems it is, of course, possible for the terminal operator to physically ring-up the central computer system over a telephone line and personally make the connection when an indication is received that a line is available. Such a system however is not particularly efficient in terms of operator time and especially where there is a great deal of traffic, i.e., where the computer input lines are being used a high percentage of the time, with a consequent small percentage of time available for a new job to connect to the system. It would obviously be quite advantageous to have a system wherein the terminal attempts to connect to telephone line and is able to automatically determine the line status. This could result for example in temporarily hanging up and trying later, or beginning the communication of a message to the central system, if the connection is successfully made.

It is also a desirable feature to be able to acoustically couple to telephone lines so that in essence a more or less conventional telephone set can be used and data fed into the telephone line or received from the telephone line utilizing acoustic means with said set. With acoustic coupling it is not necessary to modify either the computer terminal or the telephone line itself as any data to be transmitted in either direction is place on an appropriate acoustic carrier capable of being transmitted within the bandwidth capabilities of the line without significant attention. However, to utilize an unmodified conventional voice line in a completely automatic (without human intervention) fashion it is necessary to be able to automatically detect the line status signals which the telephone company conventionally uses.

SUMMARY AND OBJECTS

It has been found that a very efficient apparatus may be provided for automatically analyzing the progress of a call on a telephone line. The apparatus is provided with a pick-up device for monitoring the line performs the steps of filtering and shaping the acoustic call progress signal, and timing the signal to determine the cadence of said received signals. By performing these simple operations the system is able to automatically determine the progress of a given call through the telephone system.

It is accordingly a primary object of the present invention to provide an automatic call progress signal detector.

It is a further object to provide such a progress detector suitable for acoustic coupling to a telephone line.

It is a still further object of the invention to provide such a detector particularly adapted for connecting computer terminals and the like to a central or other computer facility.

It is yet another object of the invention to provide such a detector utilizing wave shaping, detecting and timing circuitry for determining signal cadence of telephone line status signals.

Other objects, features and advantages of the invention will be apparent from the following description.

BRIEF DESCRIPTION OF THE DRAWINGS

FIG. 1 is a block diagram of a preferred embodiment of a call progress signal detector embodying the principles of the present invention.

FIG. 2 is a schematic diagram of a typical band pass filter for use with the system of FIG. 1.

FIG. 3 is a schematic diagram of a variable gain amplifier suitable for use with the system disclosed in FIG. 1.

FIG. 6 is a functional block diagram of a time measurement circuit suitable for use with the embodiment of FIG. 1.

DESCRIPTION OF THE PREFERRED EMBODIMENT

Figure 4:
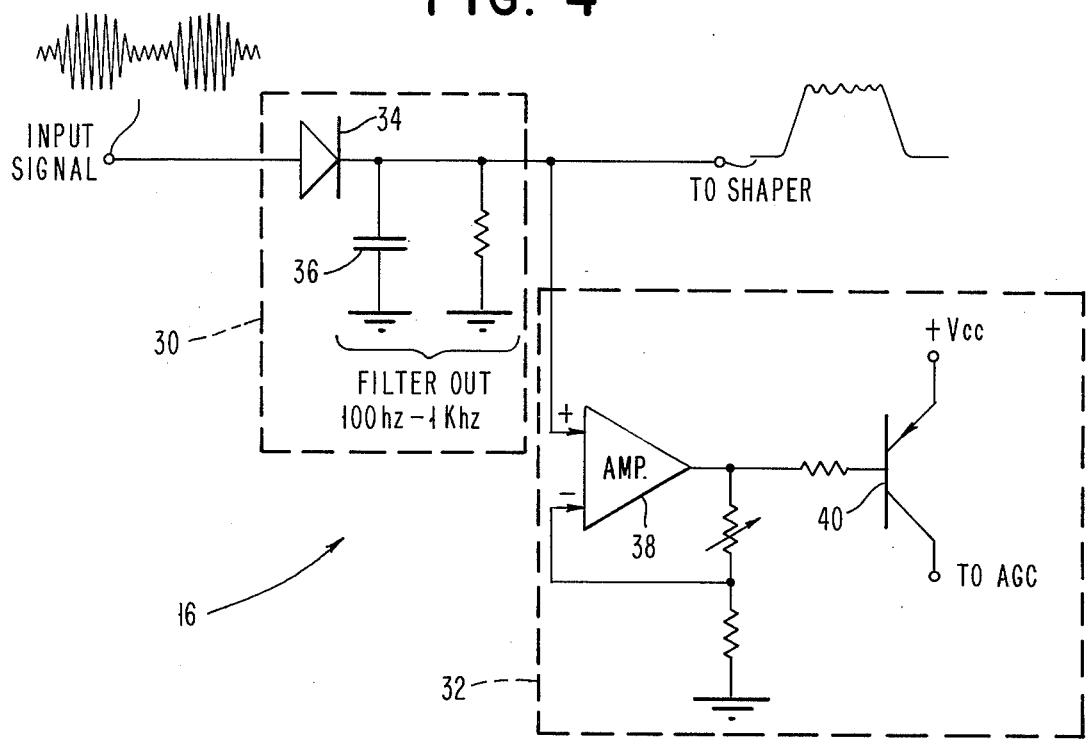
FIG. 4 comprises a suitable detector and AGC fedback source suitable for use with the embodiement of FIG. 1.
Figure 5:
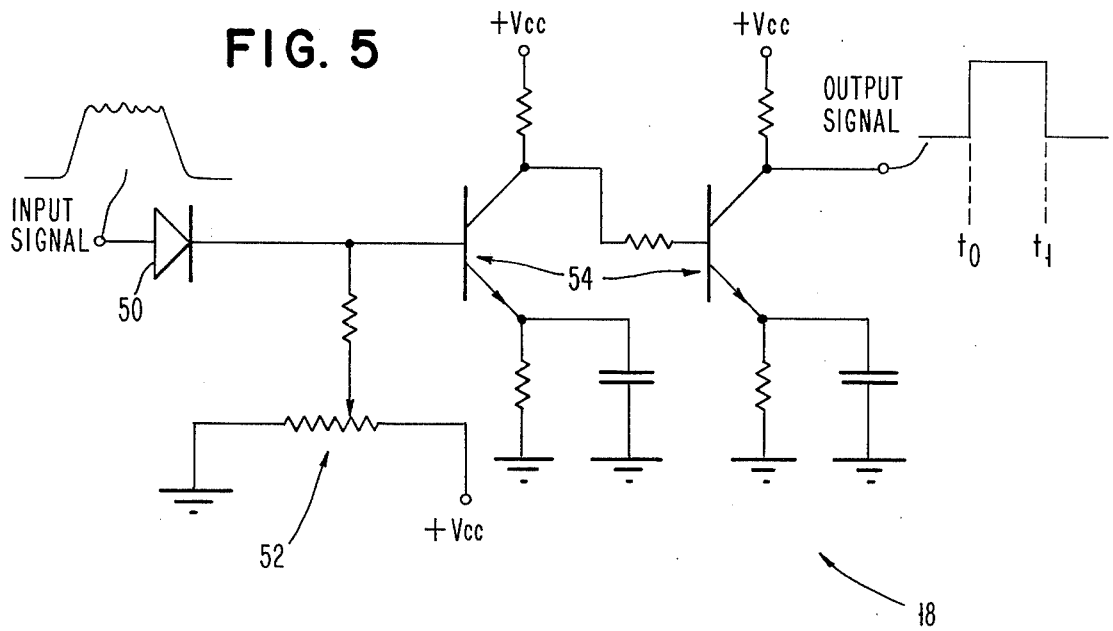
FIG. 5 comprises a shaping circuit suitable for use with the system of FIG. 1.

Referring to FIG. 1 there is shown a functional block diagram of the essential features of a call progress signal detector constructed in accordance with the teachings of the present invention. The detector that is shown is particularly suited for connecting a peripheral device such as a terminal to a central computing system. However, it will be readily appreciated that the same device could be utilized to connect terminal or satellite computers to a central system or to other satellite computers. The common aspects of the system are, as will be appreciated, the use of a telephone line for the transmission and reception of data and the requisite need to automatically connect the computer to such a line without human intervention, i.e., utilizing automatic detection and switching means.

Block is the Interface unit between the system and the telephone line. As apparent from the drawing the telephone line is shown as being connected to the box 10 together with the data lines from the terminal and lines going into the dedicated portions of the instant detector. The interface unit is a device well known in the art. It simply performs the necessary switches to couple the peripheral device to the telephone line. It must also contain requisite impedance matching devices and protective devices to prevent unwanted signals from getting on the telephone lines.

As will be apparent from the above description of the interface unit the device requires a mechanical switch to complete the telephone line subscriber circuit as with the hook-up on a handset, that is, when the receiver is lifted and it is desired to couple into the line, either for purposes of transmitting or receiving. All other connections are made to the line, i.e., data exchanges through such switch. Alternatively an acoustic coupler could equally well be used with the present invention.

As stated previously it will be noted that the unit 10 shows essentially six lines connected thereto, two being from the external telephone line, and two going to the call progress signal detector. The last two lines labled Data Channel from Terminal are the lines over which the actual data is transmitted to and from, the terminal device when the proper output signal is received from the present signal detector. In other words, these signals are utilized by the terminal controls to determine whether or not to transmit data over the lines depending upon the current detected condition of said lines.

Before proceeding further with the description of the remainder of the present detector, there will follow a brief description of the use of call progress signals in the telephone system. These signals are audio notes or tones used to indicate to the user the current status of a call which is being placed. Thus a dial tone indicates that service is available. A ring-back indicates that a call has been successfully connected and is ringing at the receiver location. Various classes of busy signals indicate that either a subscriber station or a trunk is not available for service at this time.

In the Bell System these audible signals are normally presented in terms of four pure tones which may be used singly or in pairs, e.g., the dial tone consists of a 350 hertz and a 440 hertz signal transmitted together. Further and more importantly candence characteristics are unique with various conditions which it is desired to specify.

For the present description five primary signals or classes of signals are of interest. It will be noticed in the following table that all of these five signals have unique cadence characteristics. It will be seen that it is possible to distinguish these different cadence characteristics to provide adequate signal discrimination without considering additional unique characteristics such as signal frequency. As a matter of course signal frequency could readily be utilized as a further carrier of information if desired in such a system. Thus if two distinct signal frequencies were utilized assuming that the same cadence patterns are available to each frequency, twice as much information could be transmitted. However, it should be clearly understood that for the purposes of the subsequent discussion it is assumed that the tone frequency is the same or is modified only slightly for aesthetic reasons.

The following is a table illustrating the cadence characteristics of the five commonly used telephone system call progress signals. Column 1 specifies the function of the signal. Column 2 indicates the overall cadence for the particular signals. Column 3 indicates the cadence ratio and finally Column 4 indicates the "on" time pulse width for individual signals. It will be appreciated that these specifications will vary somewhat in different systems, however, once set in a given system they are closely adhered to.

Table I

| Signal Function | Cadence Characteristic | Cadence Ratio (On:Off) | Pulse Width |
|---|---|---|---|
| Dial Tone | Continuous | 1:0 | Continuous |
| Busy | 60 IPM | 1:1 | .5 sec. |
| Trunk Busy | 120 IPM | 1:1 | .25 sec. |
| Ringback | 2 sec on; 4 sec off | 1:2 | 2.0 sec. |
| No Service | No Signal | 0:1 | Off |

The present invention utilizes the cadence characteristics of the telephone system call progress signals to discriminate between said signals. Referring to the fourth column labeled Pulse Width it will be noted that all five signals have a unique pulse width characteristic. The present invention provides a means for automatically measuring the pulse width of the call progress tones utilized in the telephone system. The disclosed apparatus thus receives and processes the audio tone signals and automatically puts them in an optimum condition for making reasonably precise pulse width measurements on the received signals.

Referring again specifically to FIG. 1 the band-pass filter is utilized to remove such unwanted frequency characteristics as noise harmonics etc. The variable gain amplifier 14, in effect, equalizes the signal to provide an essentially uniform signal level to the detector 16. The detector 16 removes the signal envelope from the audio frequency carrier and is thus an AM detector. The shaper circuit 18 improves the shape and standardizes the output of the detector 16 to provide sharper leading and trailing edges as well as a precisely clipped top and bottom. This function allows the timing circuitry 20 to more precisely and accurately measure the pulse width.

The timing circuitry 20 may take a number of different forms. As will be understood, the basic requirement is to measure the width of a given pulse and depending upon the measurement made determine which of the five signal categories a received signal fits. With such timing circuitry, the leading and trailing edges of a pulse whose width is to be measured are utilized as control functions for turning on and subsequently turning off a reference circuit having a characteristic which may readily be measured and is a function of time. Thus in the case of an analog circuit the charging of a capacitor could be functionally monitored and the final charge magnitude measured to indicate the amount of time the charging circuit was on. Conversely in a digital environment a counter could be started and subsequently turned off and the maximum count reached used as an indication of the time during which the counter was running. It will readily be appreciated that in accordance with the pulse width, one of the five output lines 22 from the timing circuitry will be activated. These output lines 22 are fed to the terminal control circuitry or the like which performs the physical connection of the terminal to the telephone line via the interface unit for subsequent data transmission and or reception.

Referring again to the fourth column of the above table, a 'dial tone' is represented by a continuous audio tone on the line. The 'subscriber set busy' or 'trunk busy' are represented by intermittent tones of 0.5 and 0.25 seconds respectively. The on portion of a 'ringback' tone has a duration of 2.0 seconds and 'no service' is designated by no signal on the line. Assuming by way of example that a digital pulse width measuring system is to be used, a counter having an incrementing rate of 100 increments per second would produce the following results. Assume first that a maximum running time for the counter is 3 seconds without a turnoff pulse being received. In this event the dial tone or continuous audio signal would produce a count of 300. A 'subscriber busy' tone having a pulse width of 0.5 seconds would produce a count of approximately 50. Similarly 'trunk busy' and 'ringback' tones of 0.25 and 2.0 seconds duration respectively would produce counts of 25 and 200. Finally a 'no service' condition with no turn on or turn-off signal would produce a zero count.

Thus the five counter conditions may be taken as 300, 50, 25, 200, or 0. Conventional digital logic circuitry (i.e., decoder) may be utilized to convert these five possible counts to bring up one of the five output lines 22 coming from the timing circuitry 20.

Referring now to FIG. 2, details of a typical band pass filter 12 are shown. The particular form of filter shown is a multiple Pi filter, however, many other types would serve the function just as well. The essential feature required is to remove unwanted frequencies and retain or enhance the desired signal. Thus the effects of noise and other normally occuring line transients may be substantially eliminated. The embodiment of FIG. 2 shows a lumped parameter filter, however, as will be understood active circuit filters could also be used.

FIG. 3 is a schematic diagram of a typical amplifier having AGC (Automatic Gain Control) feature. This amplifier is only one of many which could obviously be utilized to produce a uniform output signal in an environment of varying signal input magnitudes.

The detector 16 shown in FIG. 4 comprises a detector portion 30 and an AGC circuit 32. The detector in its simplest form comprises diode 34 and RC circuit 36 which filters out the carrier frequency to leave essentially the positive envelope of the received signal at the output of said detector.

The automatic gain control circuitry 32 comprises an amplifier follower stage 38 and an emitter follower stage 40. As will be understood the positive going envelope detected at point 44, the output of the detector, is used to provide gain control to the previous variable gain amplifier 14. But utilizing the correct circuit parameters the output of the detector at point 44 will tend to remain constant over a relatively wide range of input values.

FIG. 4 is a schematic diagram of a suitable pulse shaping and threshold sensing circuit for use with the present invention. As will be apparent to those skilled in the art the function of this circuit is to accept the detected wave form, clip both the bottoms and tops, and square the resultant signal up to facilitate time measurement between $t_o$ and $t_1$. The function of the diod 50 and the potentiometer 52 is to affect the bottom clipping function and that of the two transistor circuits 54 is to essentially effect the top clipping.

FIG. 6 comprises a functional block diagram of a timing or pulse width measuring circuitry suitable for use as timing circuit 20. As will be appreciated this diagram is highly functional in nature and could vary widely in details with the particular embodiment utilized. FIG. 6 shows functional details of a suitable timing configuration. The circuit comprises first a pulse generator 60 which takes the square wave from the shaper 18 and in effect differentiates the leading and trailing edges to produce triggers at times $t_o$ and $t_1$ shown at the output of the pulse generator 60. These two signals are applied as the inputs to the counter 62 which is assumed to be a continuously incrementing counter having a frequency, of 100 hertz which will begin incrementing from reset (0) at time $t_o$ and will continue to increment until a turn-off pulse is received at time $t_1$. At this time the incrementing will stop and the maximum setting of the counter will remain stored therein until the counter is reset. At some predetermined sampling time, i.e., 3 seconds as stated previously, the gate 64 is energized transferring the contents of the counter into register 66. As will be remembered the magnitude of the count will depend on the length of time the counter was allowed to run and will vary from 0 to a maximum of 300 for a full 3 seconds. The count in the register 66 is then monitored by the count detector 68 which as will be understood could be any readily available form of binary decoder capable of detecting the five desired count conditions, (or their approximate values) which will effectively bring up one of the five output lines 22.

As stated previously with reference to FIG. 1, depending upon which of these five lines is brought up, the terminal control circuitry to which the system is connected will be automatically apprized of the status of a pending service request which has been sent out over the telephone line. Thus, if a dial tone is detected the controller will know that it is connected to the line and that it is now possible to ring up a desired subscriber number, such for example as the central processor. If either busy signal is detected the system will know that although it had access to the line the particular recipient subscriber is not currently able to receive a message. A 'ringback' indication tells the controller the telephone line routing has proceded satisfactorily and the system must wait until the central processor has actually picked up the receiver and is ready to receive the message. Similarly a 'no service' condition indicates that there is some line malfunction and some other diagnostic routine must be initiated.

It should be noted that the disclosed embodiment assures that adequate signal discrimination is possible soley through pulse width measurement. However it should be understood that in certain telephone systems the pulse width standards might vary so that the pulse widths for two different signals might be the same, e.g., a 'line' or 'trunk busy' signal. In this case a second timing criteria would be used such as pulse repetition rate. In this event a second counter would be used to resolve the ambiguity. Thus the count for a 'trunk busy' would be twice that for a 'line busy', i.e., 60ipm versus 120ipm. The need for such a pulse repetition rate detector would be obvious to those skilled in the art and could be readily provided utilizing well-known concepts and designs.

As stated previously, many modifications, and additions to the present invention are possible. For example the terminal controller could periodically connect to the line and listen for a call signal utilizing some still different cadence than the one specified in table I indicating that some other unit in the system wishes to communicate with the terminal.

Having described the overall functional characteristics of the present call progress signal detector with respect to FIG. 1 and discussed details of the preferred embodiments of FIGS. 2 through 6 it will be apparent that the present system provides a fully automatic unit which allows small peripheral terminals or computers to be connected to each other or to a larger central system via coupled telephone lines. No human intervention or operation of the coupling apparatus is required as contrasted to most current data-phone systems wherein the operator must ring-up the receiving subscriber whether it be a central processor or another terminal. He must then wait until the connection has been made and then physically energize a switch to connect the calling terminal to the now dedicated line. The present system allows much more efficient use of the telephone line as well as both the receiving and transmitting terminals or processors. Further, the system allows the use of conventional acoustic signals for all control purposes and does not require any special signals or apparatus to be connected to the telephone lines which either adversely effect their operation or require extremely expensive modification thereof.

While a preferred embodiment has been set forth and described it will be readily apparent that many modifications and changes may be made within the spirit and scope of the invention. While a number of alternative embodiments have been discussed previously others will be obvious to those skilled in the art.

What is claimed is:

1. A system for analyzing audio telephone call progress signals including means for coupling the audio signal on the telephone system to said analyzing means,
   means for minimizing transient signal effects present in received signals, and normalizing the signal magnitudes,
   detector means for removing the AC component from said normalized signal,
   means for detecting the cadence of said pulses and,
   means responsive to said cadence detector for indicating which one of a particular call progress signal is present on the telephone line.

2. A telephone call progress signal analyzer as set forth in claim 1 wherein said cadence detecting means includes means for measuring the pulse width of detected audio signals occurring on said telephone line.

3. A telephone call progress signal analyzer as set forth in claim 2 wherein said pulse width measuring means includes a counter which is turned-on by a signal derived from the leading edge of said audio signal and turned-off by a signal derived from the trailing edge of said audio signal and means for decoding the setting of said counter at a predetermined time during the operating cycle of said pulse width measuring means.

4. A telephone call progress signal analyzer as set forth in claim 2 wherein said cadence detecting means further includes pulse repetition rate detection means actuable by the output of said pulse width measuring means.

5. A telephone call progress signal analyzer as set forth in claim 1 wherein said coupling means comprises an acoustic coupling device.

6. A system for analyzing audio telephone call progress signals including means for coupling the audio signal on the telephone system to the analyzing system,
   band pass filter means for receiving and filtering audio telephone call progress signals received from said coupling means,
   amplifier means having an automatic gain control feedback loop for maintaining a substantially constant signal output level with varying input signal magnitudes, detector means for recovering the DC envelope from the Ac audio output of said variable gain amplifier, said detector further including AGC control signal generating means for controlling said variable gain amplifier,
   shaping circuit means for substantially converting the output of said detector to a square wave by clipping and clamping the signal and minimizing the rise and fall times,
   time analyzing means for measuring the width of the output pulse from said last named means and means responsive to said measurement for determining which of a set of standardized audio call progress signals of the telephone line has been received.

7. A telephone call progress signal detector which receives acoustic call progress signals from a telephone system to which it is connected through an acoustic coupling device said detector comprising,
   a band pass filter for receiving and filtering audio telephone call progress signals from said coupling means,
   a variable gain amplifier having an automatic gain control feedback loop for maintaining a substantially constant signal output with varying input signal magnitudes,
   detector means for recovering the DC envelope from the audio AC output of said variable gain amplifier, said detector further including AGC control signal means for controlling said variable gain amplifier,
   means for clipping and clamping said signal and minimizing the rise and fall times of the signal emanating from the detector,
   time analyzing means for determining the cadence of the output pulses from said last named means and,
   means responsive to said cadence measurement means for determining which of a set of standardized audio call progress signals on the telephone line has been received.

8. A telephone call progress signal detector as set forth in claim 7 wherein said time analyzing means includes means for measuring the pulse width of detected call progress signals.

9. A telephone call progress signal detector as set forth in claim 8 wherein said time analyzing means includes a counter which is initiated at the beginning of a pulse, is periodically incremented and turned off at the end of a pulse whose cadence is to be measured.

10. A telephone call progress signal detector as set forth in claim 9 said determining means including means for energizing one of a set of output lines indicating that a particular call progress signal has been detected on the line to which the system is coupled.

* * * * *